United States Patent
Shiraki et al.

(10) Patent No.: US 7,410,294 B2
(45) Date of Patent: Aug. 12, 2008

(54) TEMPERATURE SENSOR

(75) Inventors: Satoru Shiraki, Yuri-gun (JP); Kaoru Sasaki, Tokyo (JP); Yutaka Wakabayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 233 days.

(21) Appl. No.: 10/559,763

(22) PCT Filed: Jun. 22, 2004

(86) PCT No.: PCT/JP2004/008752

§ 371 (c)(1),
(2), (4) Date: Dec. 7, 2005

(87) PCT Pub. No.: WO2005/001404

PCT Pub. Date: Jan. 6, 2005

(65) Prior Publication Data

US 2007/0110124 A1    May 17, 2007

(30) Foreign Application Priority Data

Jun. 25, 2003    (JP) .............................. 2003-181598
Jun. 30, 2003    (JP) .............................. 2003-188511

(51) Int. Cl.
    *G01K 1/00*    (2006.01)
(52) U.S. Cl. ....................................... 374/208; 374/163
(58) Field of Classification Search ................ 374/147, 374/148, 208, 185; 338/25, 28, 275
See application file for complete search history.

(56) References Cited

U.S. PATENT DOCUMENTS

| | | | | |
|---|---|---|---|---|
| 4,560,973 A | * | 12/1985 | Grimm et al. .................. 338/28 |
| 5,481,240 A | * | 1/1996 | Fukaya et al. ............. 338/22 R |
| 5,733,044 A | * | 3/1998 | Rose et al. ................... 374/144 |
| 6,045,261 A | * | 4/2000 | Rossum et al. ............... 374/208 |
| 6,918,696 B2 | * | 7/2005 | Hoshisashi et al. .......... 374/208 |
| 7,028,568 B2 | * | 4/2006 | Tokunaga et al. .......... 73/866.5 |
| 2002/0172258 A1 | * | 11/2002 | Adachi et al. ................ 374/185 |
| 2002/0172259 A1 | * | 11/2002 | Bach .......................... 374/208 |
| 2003/0058920 A1 | * | 3/2003 | Lyle ............................ 374/185 |
| 2004/0081225 A1 | * | 4/2004 | Janicek ....................... 374/185 |

(Continued)

FOREIGN PATENT DOCUMENTS

JP    58158531 A    *    9/1983

(Continued)

*Primary Examiner*—Gail Verbitsky
*Assistant Examiner*—Mirellys Jagan
(74) *Attorney, Agent, or Firm*—Oliff & Berridge, PLC

(57) ABSTRACT

A temperature sensor with a reduced number of components is provided.

In the temperature sensor (10) in accordance with the present invention, a cap part (44A) of a sensor cover (44) covers an opening (14) of a holder (12) as a whole, whereby water droplets and the like are prevented from entering between the holder (12) and a filler resin part (42). A neck part (44B) of the sensor cover (44) keeps a harness pair (34A, 34B) from breaking by bending in excess. Both of the cap part (44A) and neck part (44B) are a part of the sensor cover (44) and are integrated together. The number of components in the temperature sensor (10) employing such a sensor cover (44) is smaller than that in a temperature sensor (50) in which a cap and a lead drawing member are separate from each other.

16 Claims, 15 Drawing Sheets

U.S. PATENT DOCUMENTS

2004/0101031 A1* 5/2004 Kotwicki .................... 374/185
2004/0264544 A1* 12/2004 Fischer et al. ............... 374/208

FOREIGN PATENT DOCUMENTS

| | | |
|---|---|---|
| JP | A 61-110019 | 5/1986 |
| JP | 61142430 A * | 6/1986 |
| JP | A 2-247532 | 10/1990 |
| JP | A 3-108624 | 5/1991 |
| JP | U 5-3955 | 1/1993 |
| JP | U 6-62336 | 9/1994 |
| JP | A 8-128901 | 5/1996 |
| JP | A 11-23379 | 1/1999 |
| JP | A 2000-105151 | 4/2000 |
| JP | A 2001-343292 | 12/2001 |
| JP | A 2002-267540 | 9/2002 |
| JP | 2005-017088 | 1/2005 |

* cited by examiner

TEMPERATURE SENSOR

TECHNICAL FIELD

The present invention relates to a temperature sensor which detects the fluid temperature of ATF (Automatic Transmission Fluid) of a car and the like.

BACKGROUND ART

Conventional temperature sensors in this technical field are disclosed in the following Patent Documents 1 and 2, for example. In the temperature sensors described in these publications, a bottomed tubular holder made of brass containing a glass-sealed thermistor (temperature detecting device) is filled with a resin, so as to prevent water from entering the temperature detecting device part. Respective one end parts of leads are connected to the temperature detecting device of such a temperature sensor, whereas the other end parts are connected to an electrode pair extending to the outside of the resin. A pair of leads for transmitting signals detected by the temperature detecting device to a control processor are connected to the electrode pair.

The inventors advanced studies concerning temperature sensors which do not necessitate an electrode pair which is a part with a high possibility of short-circuiting and, as a result, have completed a prototype of temperature sensor 50 as shown in FIG. 15. FIG. 15 is a schematic sectional view showing a prototype of temperature sensor (not publicly known). As shown in FIG. 15, a temperature detecting device 56 having a pair of leads 54A, 54B connected thereto is disposed at a bottom part of a bottomed tubular holder 52 made of a metal in the temperature sensor 50, whereas the holder 52 is filled with a resin 58. The resin 58 filling the holder 52 forms a cylindrical side wall 62 on the opening 60 side of the holder 52. The side wall 62 constructed by the resin is formed with a hole 64 through which the leads penetrate, whereas the leads 54A, 54B drawn out of the resin 58 are bent and taken out by way of the hole 64.

A lead drawing member 66 having a part buried in the side wall 62 is attached to the outside of the hole 64 formed in the side wall 62. The lead drawing member 66 is a tubular elastic body and restrains the leads 54A, 54B from bending in excess in the vicinity of the hole 64. Such a lead drawing member 66 prevents the leads 54A, 54B from bending by an angle near 90 degrees and breaking in the vicinity of the hole 64, which is a part where the leads 54A, 54B are likely to bend greatly in a part from which the leads 54A, 54B are taken out.

The inside of the side wall 62 formed by the resin 58 is filled with a resin 68 so as to bury the leads 54A, 54B. This prevents water from entering from the interface between the resin 58 and the leads 54A, 54B, and secures and protects the leads 54A, 54B. A waterproof cap 70 covers the resin 68 and side wall 62. The waterproof cap 70 covers the upper part of the temperature sensor exposed to an environment incurring water droplets and steam, and thus prevents water droplets and the like from entering the inside of the sensor 50 from boundaries of the members and reaching the temperature detecting device 56. Here, numeral 72 refers to a metal stay, insert-molded with the resin 58, for supporting the leads from the lower side and suppressing their movement, whereas numeral 74 refers to a protective tube for preventing the metal stay 72 from damaging the leads 54A, 54B.

Patent Document 1: Japanese Patent Application Laid-Open No. HEI 11-23379
Patent Document 2: Japanese Utility Model Application Laid-Open No. HEI 5-3955
Patent Document 3: Japanese Patent Application Laid-Open No. 2002-267540
Patent Document 4: Japanese Utility Model Application Laid-Open No. HEI 6-62336
Patent Document 5: Japanese Patent Application Laid-Open No. HEI 8-128901

DISCLOSURE OF THE INVENTION

Problem to be Solved by the Invention

However, the following problem exists in the temperature sensor in the prototype stage mentioned above. Namely, since the lead drawing member 66 and waterproof cap 70 are constituted by materials different from each other, they construct the temperature sensor 50 as members different from each other. This inhibits the number of components from decreasing, along which manufacturing steps are deterred from being simplified.

For overcoming the above-mentioned problem, it is an object of the present invention to provide a temperature sensor having a reduced number of components.

Means for Solving Problem

The temperature sensor in accordance with the present invention comprises a bottomed tubular holder having an opening; a temperature detecting device, contained in a bottom part of the holder, having a lead pair connected thereto so as to be introduced from the opening side; a filler resin part filling the holder so as to seal the temperature detecting device and extending to the opening; and a sensor cover integrated with a cap part covering the whole opening and a neck part extending to the outside of the cap part along an outer peripheral face of the lead pair drawn out of the cap part.

In this temperature sensor, the cap part of the sensor cover covers the whole opening of the holder, thereby preventing water droplets and the like from entering between the holder and the filler resin part. The neck part of the sensor cover restrains leads from breaking by bending in excess. The cap and neck parts are a part of the sensor cover and are integrated together. In the temperature sensor employing such a sensor cover, the number of components is smaller than that in the temperature sensor in the prototype stage in which the cap and the lead drawing member are separate from each other.

It will be preferred if a guide part, projecting from an edge of the opening in the holder, for guiding leads constituting the lead pair is further provided, whereas the sensor cover covers the guide part. In this case, the sensor cover limits the movement of lead pair about the guide part, whereby the guide part can guide the leads more reliably.

Preferably, the guide part has a T-shaped form including a part extending in a direction perpendicular to an extending direction of the holder and a part extending parallel to the extending direction of the holder. In this case, the part extending in the direction perpendicular to the extending direction of the holder restrains the sensor cover from dropping out.

It will be preferred if an edge of the opening of the holder is formed with a substantially annular hook part projecting to the outside of the holder, whereas the hook part engages at least a part of the sensor cover. In this case, the sensor cover can be restrained from dropping out of the holder.

Preferably, the sensor cover is formed by hot melt molding. In this case, the sensor cover can reliably be formed by hot melt molding which is a molding method suitable for practical use.

It will be preferred if a sensing part to be dipped into a fluid in a case to be subjected to temperature measurement is provided, the sensing part contains the temperature detecting device having the lead pair connected thereto, and the temperature detecting device is covered only with a device protecting part made of a resin. In this temperature sensor, the temperature detecting device having the lead pair connected thereto is contained in the sensing part. The temperature detecting device is covered only with the device protecting part made of a resin. Namely, this temperature sensor does not use a conductive holder, so that the temperature detecting device and the lead pair do not come into contact with a conductor, whereby temperature detecting signals of the sensor are stabilized. Therefore, unlike conventional temperature sensors accommodating the temperature detecting device in a holder made of a metal, this temperature sensor is not required to take account of insulation of the temperature detecting device and lead pair from conductors, so that the operation of making the sensor becomes simpler, thereby increasing the efficiency in the operation of making the same. Also, since it does not use a holder made of a metal which is hard to shape, the making of the sensor becomes easier, and the cost of making components is cut down.

Preferably, the device protecting part has a laminate structure constituted by different kinds or the same kind of resins. In this case, a resin to be dipped in the fluid and a resin to directly cover the temperature detecting device can be chosen as necessary.

It will be preferred if the holder is constituted by a resin, whereas the device protecting part is constituted by the holder and the filler resin part filling the holder. Though the water tightness between the holder and the filler resin part filling the holder is low in conventional temperature sensors using the holder made of a metal, the water tightness between the holder and the filler resin part improves when the holder made of a resin is thus filled with a resin.

Preferably, the device protecting part contains a polyphenylene sulfide resin as a constituent material. This resin has such a high thermal conductivity that it does not affect the temperature detection level of the temperature detecting device. Also, this resin has such a high fluidity that it can be molded with a high precision even when molds have a complicated form.

Effect of the Invention

The present invention provides a temperature sensor having a reduced number of components.

Figure 1:
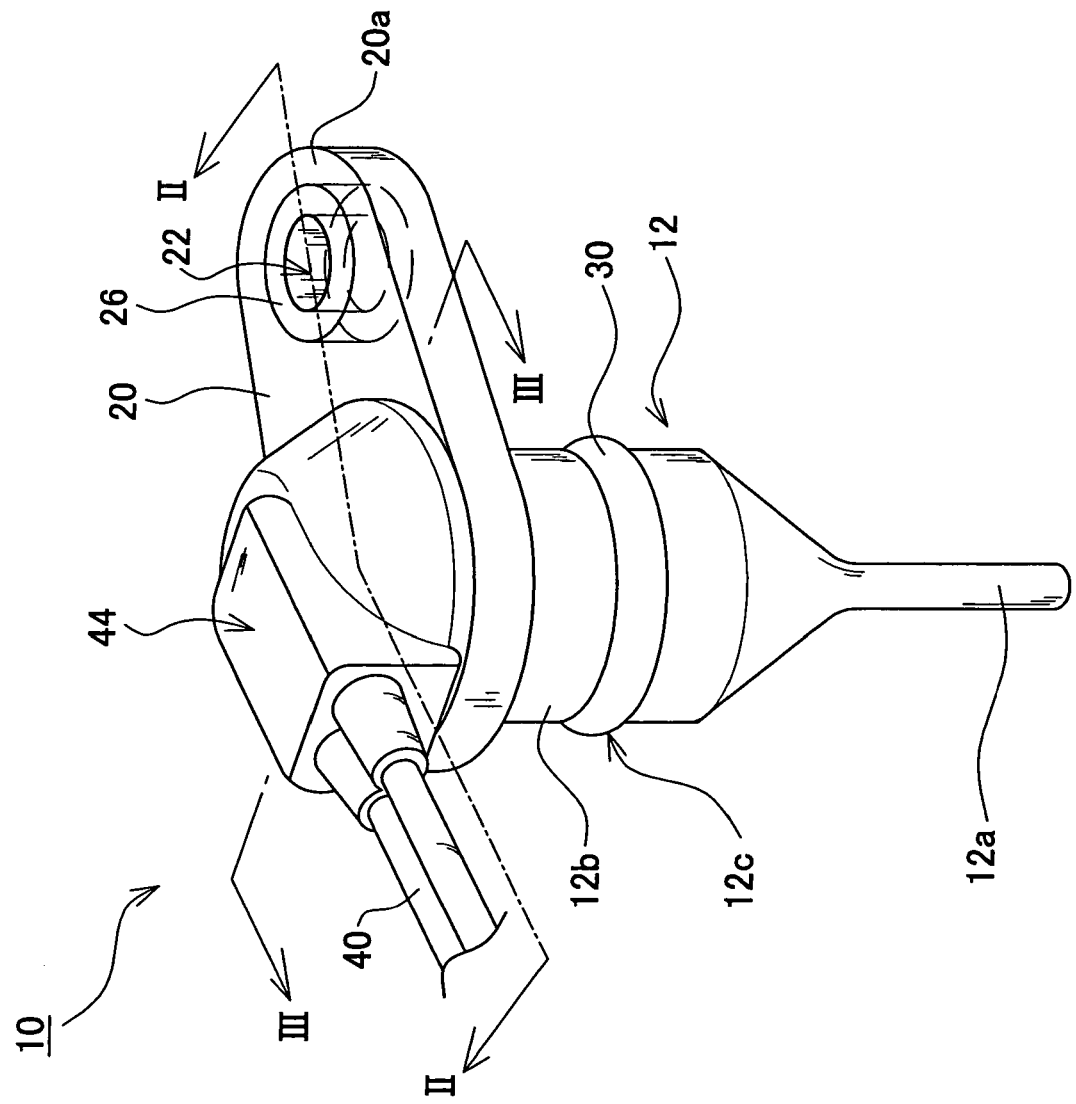
FIG. 1 is a schematic perspective view showing the temperature sensor in accordance with an embodiment of the present invention.

EXPLANATIONS OF NUMERALS OR LETTERS 10, 50, 101 temperature sensor
12 holder
12a, 121 sensing part
12c sealing part
14 opening
16 hook part
18 guide part
18a, 18b portion of the guide part
32, 110 thermistor
34A, 34B harness
42 filler resin part
43, 120 device protecting part
44 sensor cover
44A cap part
44B neck part
112, 113 lead

BEST MODES FOR CARRYING OUT THE INVENTION

In the following, preferred embodiments of the temperature sensor in accordance with the present invention will be explained in detail with reference to the accompanying drawings. Constituents identical or equivalent to each other will be referred to with numerals identical to each other while omitting their overlapping descriptions if any.

Figure 2:
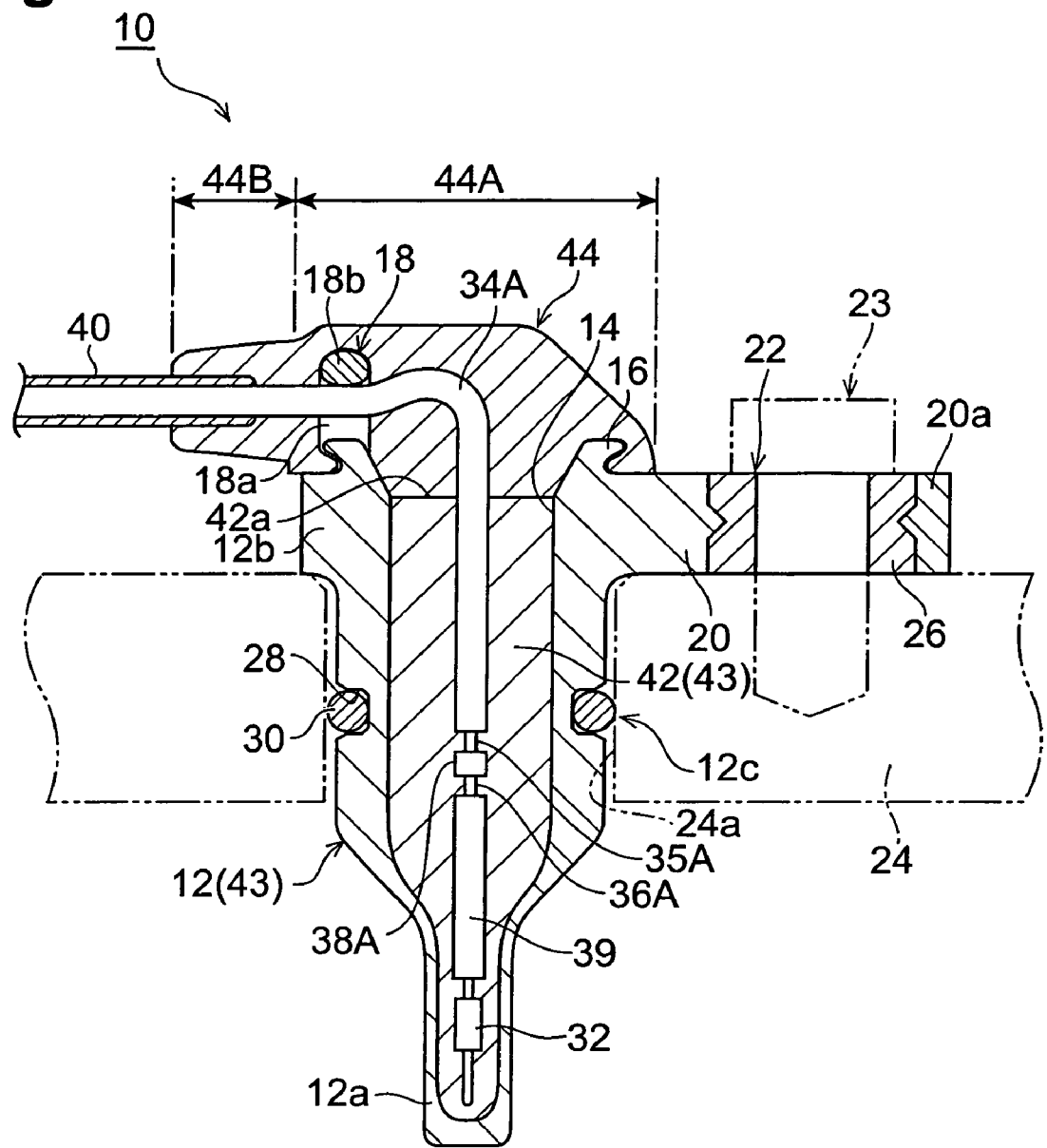
FIG. 2 is a sectional view taken along the line II-II of FIG. 1.
Figure 3:
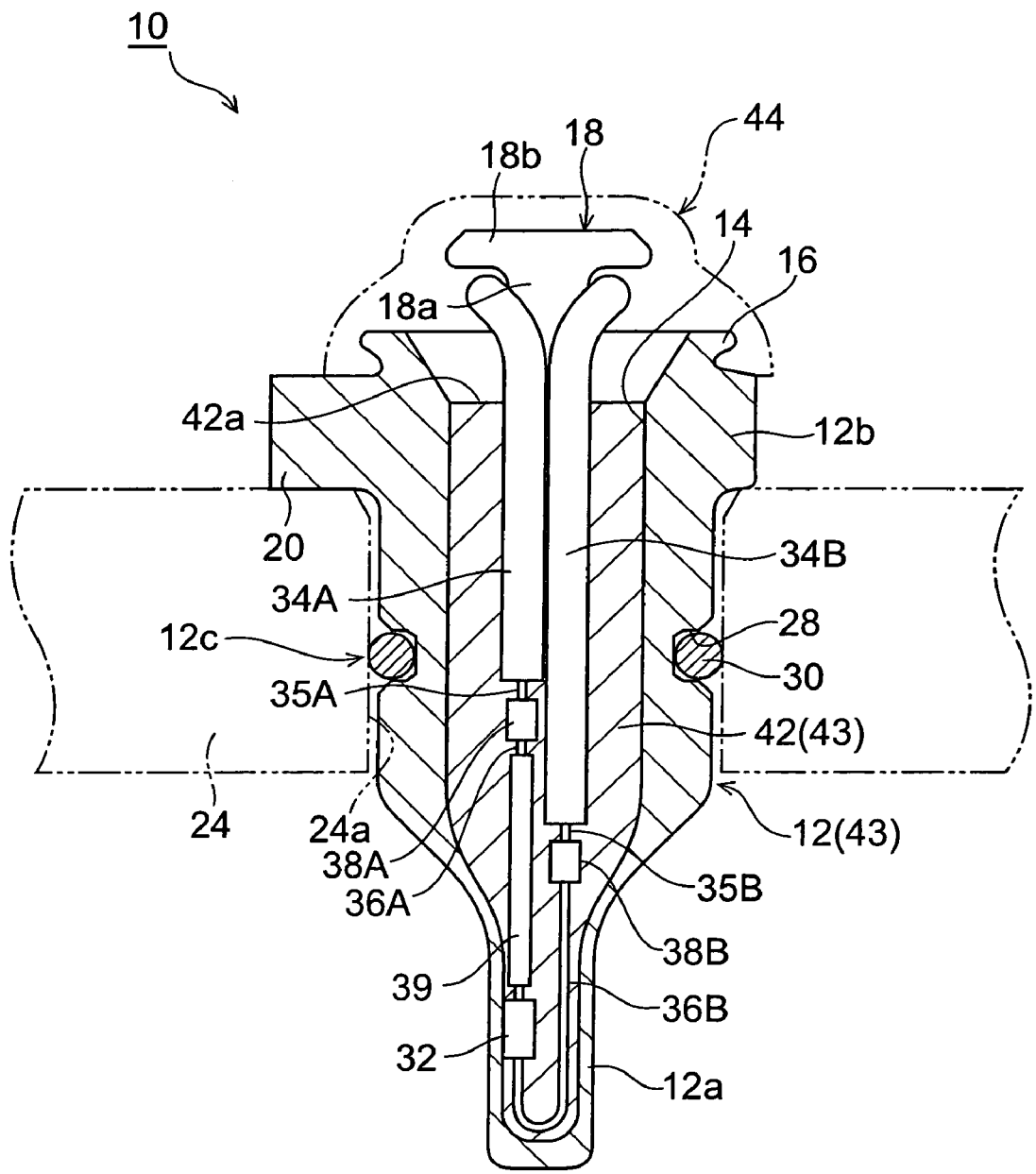
FIG. 3 is a sectional view taken along the line III-III of FIG. 1.

FIG. 1 is a schematic perspective view showing the temperature sensor in accordance with an embodiment of the present invention. FIG. 2 is a sectional view of the temperature sensor taken along the line II-II of FIG. 1. FIG. 3 is a sectional view of the temperature sensor taken along the line III-III of FIG. 1.

The temperature sensor 10 in accordance with the embodiment of the present invention shown in FIGS. 1 to 3 is a temperature sensor which is inserted into an automatic transmission of a car, so as to detect the ATF temperature within the transmission. The temperature sensor 10 includes a bottomed cylindrical holder 12 made of a polyphenyl sulfide (PPS) resin. The PPS resin has such a high fluidity as to yield the holder 12 with a high precision. In the holder 12, the diameter on the bottom side 12a, which is the lower end side, is smaller, whereby the bottom side 12a becomes the sensing part 12a of the temperature sensor 10 to be dipped into the ATF within the automatic transmission housing (case) to be subjected to temperature measurement. An opening 14 is formed on the upper end side 12b of the holder 12. The opening 14 has a circular form, whose edge is formed with a hook part 16. The hook part 16 projects so as to extend in a direction perpendicular to the side wall of the holder 12, while having a substantially annular form. The edge of the opening 14 is formed with a T-shaped guide part 18 in parallel with a direction in which the holder 12 extends. The guide part 18 projects from along the edge of the opening 14, whereas a pair of harnesses 34A, 34B, which will be explained later, are guided between the guide part 18 and the edge of the opening 14.

Formed on the upper end side 12b of the holder 12 is a sensor fixing part 20 projecting so as to extend in a direction perpendicular to the side wall of the holder 12. On the free end side 20a, the sensor fixing part 20 is formed with a through hole 22 parallel to the extending direction of the holder 12, whereas a screw 23 having a predetermined size secures the temperature sensor 10 and an object 24 to be placed (i.e., the case of the automatic transmission) to each other by way of the through hole 22. A cylindrical pipe 26 made of a metal is inserted as the side wall of the through hole 22, so as to enhance the rigidity of the through hole 22 against the screw 23. Formed near the center of the side wall of the holder 12 is a sealing part 12c which prevents the ATF from leaking out of the object 24 to be placed. The sealing part 12c is constituted by an annular depression 28 formed along the outer periphery of the holder 12 and an elastic sealing ring 30 made of a resin fitted in the depression 28. The above-mentioned object 24 to be placed is provided with a hole 24a smaller than the outer diameter of the sealing ring 30. When the holder 12 is inserted into the hole 24a, the sealing ring 30 reliably seals the object 24 to be placed.

Disposed within the sensing part 12a having a narrowed diameter is an NTC (Negative Temperature Coefficient) thermistor 32 which detects the ATF temperature within the range of −40° C. to 150° C. Here, the PPS resin constituting the shell of the sensing part 12a is favorable in that its thermal conductivity is so high that it does not affect the temperature detection level of the thermistor 32. The thermistor (temperature detecting device) 32 is formed from manganese, nickel, cobalt, or the like, for example, so as to become a polycrystal ceramics in which crystal grains of a so-called spinel structure gather. The thermistor 32 is sealed with glass so as to be waterproofed, whereas a pair of harnesses (pair of leads) 34A, 34B each coated with crosslinked polyethylene are connected thereto so as to be introduced from the opening 14. A pair of conductors 35A, 35B passing through the pair of harnesses 34A, 34B and a pair of conductors 36A, 36B drawn out of the thermistor 32 are joined together, respectively, by crimping with their corresponding joint bands 38A, 38B. Numeral 39 shown in FIGS. 2 and 3 refers to a fluororesin tube (e.g., Teflon (registered trademark) tube) covering the conductor 36A, thereby preventing the conductors from being short-circuited by coming into contact with each other.

One end side of the pair of harnesses 34A, 34B is connected to the thermistor 32 as mentioned above, whereas the other end side is drawn out of the temperature sensor 10 and, while in a state bundled with a protective tube 40 made of crosslinked polyolefin, connected to a control processor (not depicted) which processes temperature detection signals detected by the thermistor 32. Upon receiving a temperature detection signal, the control processor regulates a transmission timing and the like of the automatic transmission according to this signal.

The thermistor 32 and harness pair 34A, 34B are accommodated in a state where the holder 12 is filled with an epoxy resin up to near the opening 14 on the upper end side 12b, whereas the resin is thermally cured, so as to form a filler resin part 42. The resin filler part 42 restrains water from entering the thermistor 32 from the opening 14 of the holder 12 and the harness pair 34A, 34B, and suppresses the movement of the thermistor 32 and the like. Thus, the filler resin part 42 covering the thermistor 32 and the holder 12 containing the filler resin part 42 form a device protecting part 43 covering the thermistor 32 in a watertight fashion. The harness pair 34A, 34B is fixed in parallel with the extending direction of the holder 12 at the time of resin filling, and is erected substantially perpendicularly in the vicinity of the surface 42a of the filler resin part 42.

The harness pair 34A, 34B extending substantially vertically from the surface 42a of the filler resin part 42 is bent at substantially right angles toward the above-mentioned guide part 18. A part 18a of the guide part 18 extending in parallel with the extending direction of the holder 12 divides the harness pair 34A, 34B into the individual harnesses 34A, 34B, which are guided so as to pass through the space between a part 18b extending in a direction perpendicular to the extending direction of the holder 12 and the edge of the opening 14. When the guide part 18 guides the harnesses 34A, 34B, a portion 18b of the guide part 18 presses the harnesses 34A, 34B from the upper side, whereby the friction force accompanying the pressing restrains the harnesses 34A, 34B from moving and prevents the harnesses 34A, 34B from dropping out of the holder 12.

A center cover (lead drawing part) 44 is formed at the opening 14 of the holder 12 so as to cover the opening 14 as a whole. The sensor cover 44 is formed by hot melt molding with polyester, and is constituted by a cap part 44A and a neck part 44B (see FIG. 2). The cap part 44A thoroughly covers the area extending from the edge of the opening 14 to the center of the surface 42a of the filler resin part 42, and has such a height as to hide the harness pair 34A, 34B and the guide part 18. Such a cap part 44A functions as a part which prevents water droplets and the like from entering between the holder 12 and the filler resin part 42. Namely, in a part of a temperature sensor employed in an automatic transmission of a car in general, a part positioned on the outside of the transmission is exposed to an environment incurring water droplets and steam, but the water droplets and the like are inhibited from entering the temperature sensor 10 when the cap part 44A covers the opening 14 as a whole.

Covering the guide part 18 with the sensor cover 44 limits the movement of the harnesses 34A, 34B about the guide part 18, whereby the guide part 18 can guide the harnesses 34A, 34B more reliably. Here, in general, the harness drawing position of the temperature sensor is restricted by arrangements with other components in a layout where the automatic transmission is disposed. However, hot melt molding can easily change the harness drawing position by altering a mold, whereby the temperature sensor 10 can easily respond to changes in layout of automatic transmissions among cars by altering hot melt molds. Further, the resin surrounding the portion 18b of guide part 18 extending in a direction perpendicular to the extending direction of the holder 12 restrains the sensor cover 44 from moving in the extending direction of the holder 12, and thus can more reliably inhibit the sensor cover 44 from dropping out.

The neck part 44B is drawn out of the cap part 44A in a direction perpendicular to the extending direction of the holder 12, and extends to the outside of the cap part 44A along the outer peripheries of the harness pair 34A, 34B and the protective tube 40 bundling the harness pair 34A, 34B. The neck part 44B is made of polyester as mentioned above, and thus is elastic. Such a neck part 44B functions as a part restraining the harness pair 34A, 34B from bending too much near the part where they are drawn out of the temperature sensor 10, and prevents the harness pair 34A, 34B from breaking upon bending in excess.

The sensor cover 44 is formed by hot melt molding as mentioned above, and thus can mold the whole opening 14 with a resin easily and reliably at a low temperature and a low pressure. Also, since the resin has a fluidity at the time of molding, polyester can reliably be caused to flow into a space under the hook part 16 disposed at the edge of the opening 14. The resin part solidified after flowing into the space under the hook part 16 cooperates with the hook part 16, so as to keep the sensor cover 44 from dropping out of the holder 12. Namely, the sensor cover 44 engages the hook part 16, thereby being kept from dropping out of the holder 12.

In the temperature sensor 10, as explained in detail in the foregoing, the sensor cover 44 comprises the cap part 44A, which is a part for preventing water droplets and the like from entering between the holder 12 and the filler resin part 42, and the neck part 44B, which is a part for restraining the harness pair 34A, 34B from bending too much in the vicinity of the part where they are drawn out of the temperature sensor 10. In the temperature sensor 10 employing the sensor cover 44 in which such cap part 44A and neck part 44B are integrated, the number of components is smaller than that in the temperature sensor 50 (see FIG. 15) in the prototype stage in which the cap part and the lead drawing member (neck part) are separate from each other.

In the temperature sensor 50 (see FIG. 15) in the prototype stage, the holder 52 made of a metal and the resin 58 filling it are different from each other in terms of their physical characteristics (e.g., thermal conductivity) and mechanical characteristics (e.g., Young's modulus). Therefore, a gap is likely to be formed between the holder 52 and the resin 58 because of a drastic temperature change, an internal stress, or the like. Thus formed gap deteriorates the water tightness between the holder 52 and the resin 58. If water droplets and the like enter from this gap, the temperature detection level of the sensor will decrease, whereby the detection may be impossible because of short-circuiting in the worst case.

In the temperature sensor 10 employing the holder 12 made of the PPS resin, on the other hand, the holder 12 and the filler resin part 42 differ only slightly from each other in terms of physical and mechanical characteristics. Therefore, the gap is harder to occur between the holder 12 and the filler resin part 42 than in the temperature sensor 50 in the prototype stage, whereby the water tightness between the holder 12 and the filler resin part 42 is improved. Consequently, the temperature detecting level of the thermistor 32 is stable in the temperature sensor 10. Also from the fact that the adhesion between resins is higher than that between a polymer resin constituted by C, H, and O and a metal, the temperature sensor 10 seems to improve the water tightness between the holder 12 and the filler resin part 42 as compared with the temperature sensor 50 employing the holder 52 made of a metal.

For improving the easiness to shave, the material of a holder made of a metal used in the temperature sensor 50 or the like often contains lead, which has been demanded to limit its use from the viewpoint of environmental pollution. The making of a holder made of a metal from a material containing no lead tends to incur a high cost, since it requires a high level of technique and expensive apparatus. In this respect, the temperature sensor 10 can inexpensively cut down the amount of lead in use, since the holder 12 is made of a resin and does not contain lead.

Figure 15:
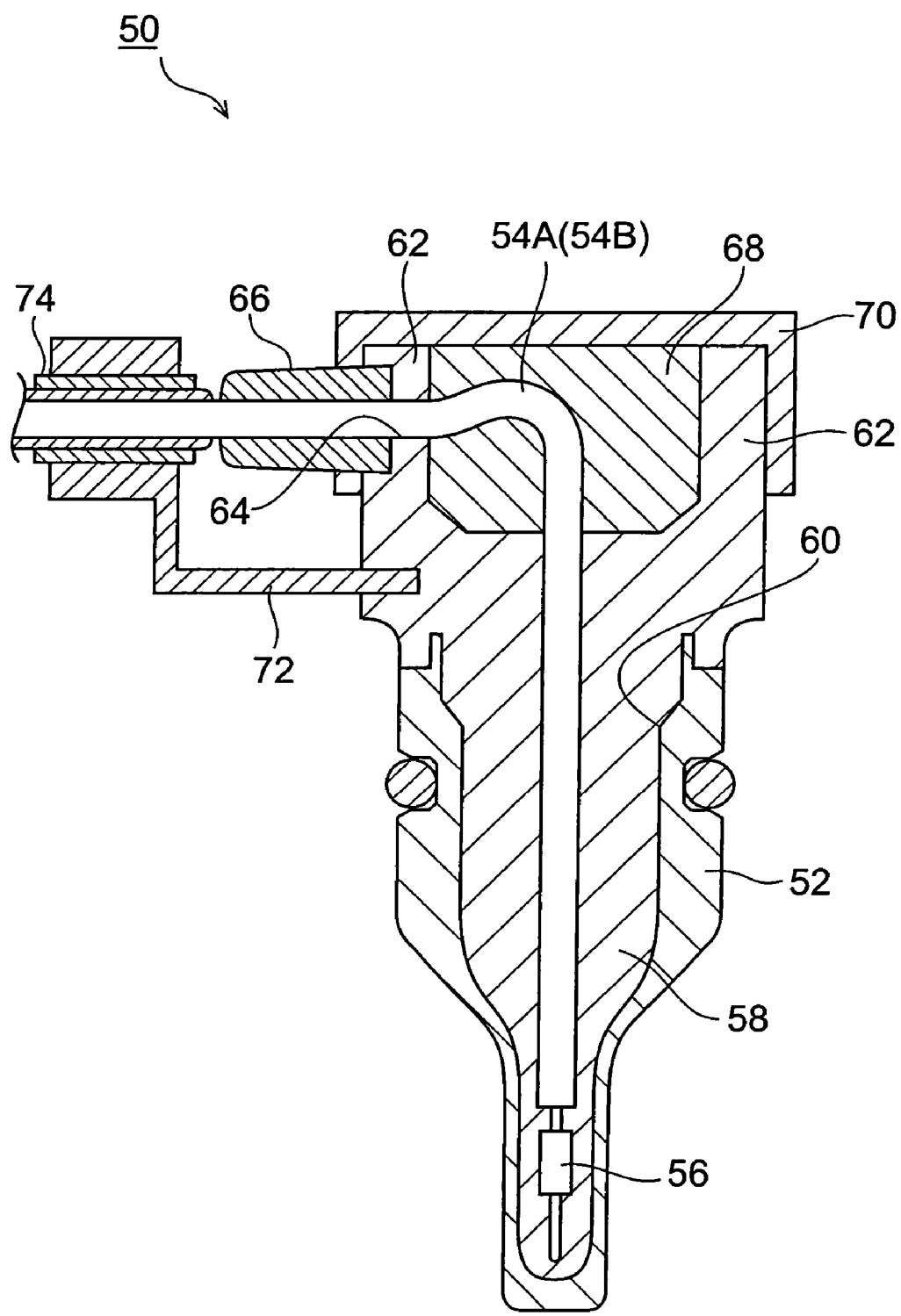
FIG. 15 is a schematic sectional view showing a prototype of temperature sensor.

Further, the temperature sensor 10 reduces components of the metal stay 72 and protective tube 74 required in the temperature sensor 50 in the prototype stage (see FIG. 15). This is because the form of molds used for hot melt molding and the hardness of polyester are adjusted, so that the neck part 44B of the sensor cover 44 reliably supports the harness pair 34A, 34B. Namely, the metal stay 72 and protective tube 74 used in the temperature sensor 50 are replaced by the sensor cover 44. When the neck part 44B of the sensor cover 44 is elongated or a polyester material having a high hardness is employed therefor, the sensor cover 44 can support the harness pair 34A, 34B more reliably.

The following problem also exists in the temperature sensor 50 in the prototype stage. Namely, since the holder 52 made of a metal such as brass is used, the holder 52 is conductive. Therefore, when a lead drawn out of the thermistor 56 comes into contact with the holder 52, the temperature detection signal of the sensor 50, which is an ohmic value, may be disturbed, whereby the temperature cannot be detected with a high precision. Consequently, the thermistor 56 must be accommodated into the holder 52 with extreme caution, which lowers the efficiency in making the sensor 50, thereby elongating the time required for the making. Hence, in the temperature sensor 10, the efficiency in the operation of making the same is improved.

Namely, in the sensing part 12a of the temperature sensor 10, the thermistor 32 is covered only with the device protecting part 43 constituted by the filler resin part 42 and holder 12. Here, the filler resin part 42 is constituted by the epoxy resin, whereas the holder 12 is constituted by the PPS resin. Thus, the sensing part 12a is configured such that the thermistor 32 is covered with the device protecting part 43, without using a conductive holder. Therefore, the thermistor 32 and the harness pair 34A, 34B do not come into contact with conductors.

Thus, unlike the temperature sensor 50 in the prototype stage accommodating a thermistor in a holder made of a metal, the temperature sensor 10 is not required to take account of the insulation of the thermistor 32 and harness pair 34A, 34B from conductors when accommodating the thermistor 32 into the holder 12, so that the operation of making the sensor becomes simpler and increases its efficiency. Namely, the efficiency in the operation of making the temperature sensor 10 is improved.

The holder used in the temperature sensor 50 in the prototype stage is made of a metal and is produced by shaving, whereby it requires enormous time and effort for making the same. On the other hand, the holder 12 employed in the temperature sensor 10 is made of a resin and can be produced easily by metallic molding. Therefore, the sensor can be made more easily when the holder is made of a resin instead of a metal. As the holder is made more easily, the cost required for making the holder is cut down. In particular, the holder 12 employs the PPS as a resin material, and thus has such a high thermal conductivity that it does not affect the temperature detection level of the temperature detecting device. Also, the PPS resin has such a high fluidity that the resin can be molded with a high precision even when molds have a complicated form.

Figure 4:
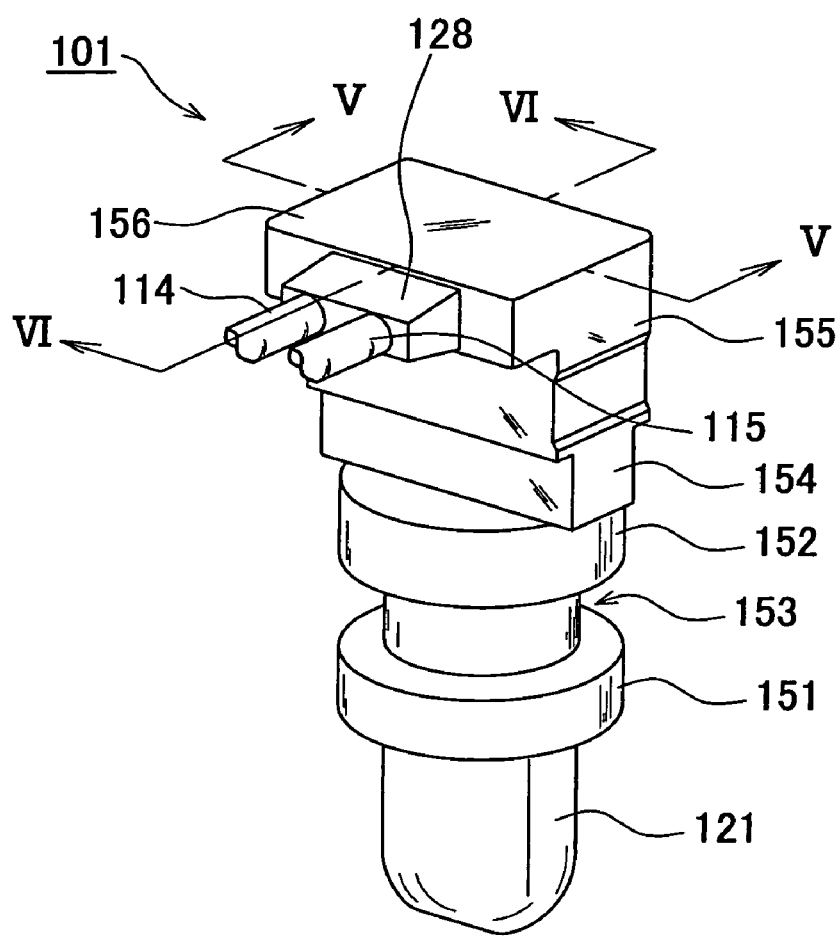
FIG. 4 is a schematic perspective view showing a temperature sensor different from the temperature sensor shown in FIG. 1.
Figure 4:
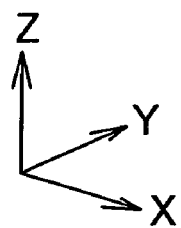
Figure 5:
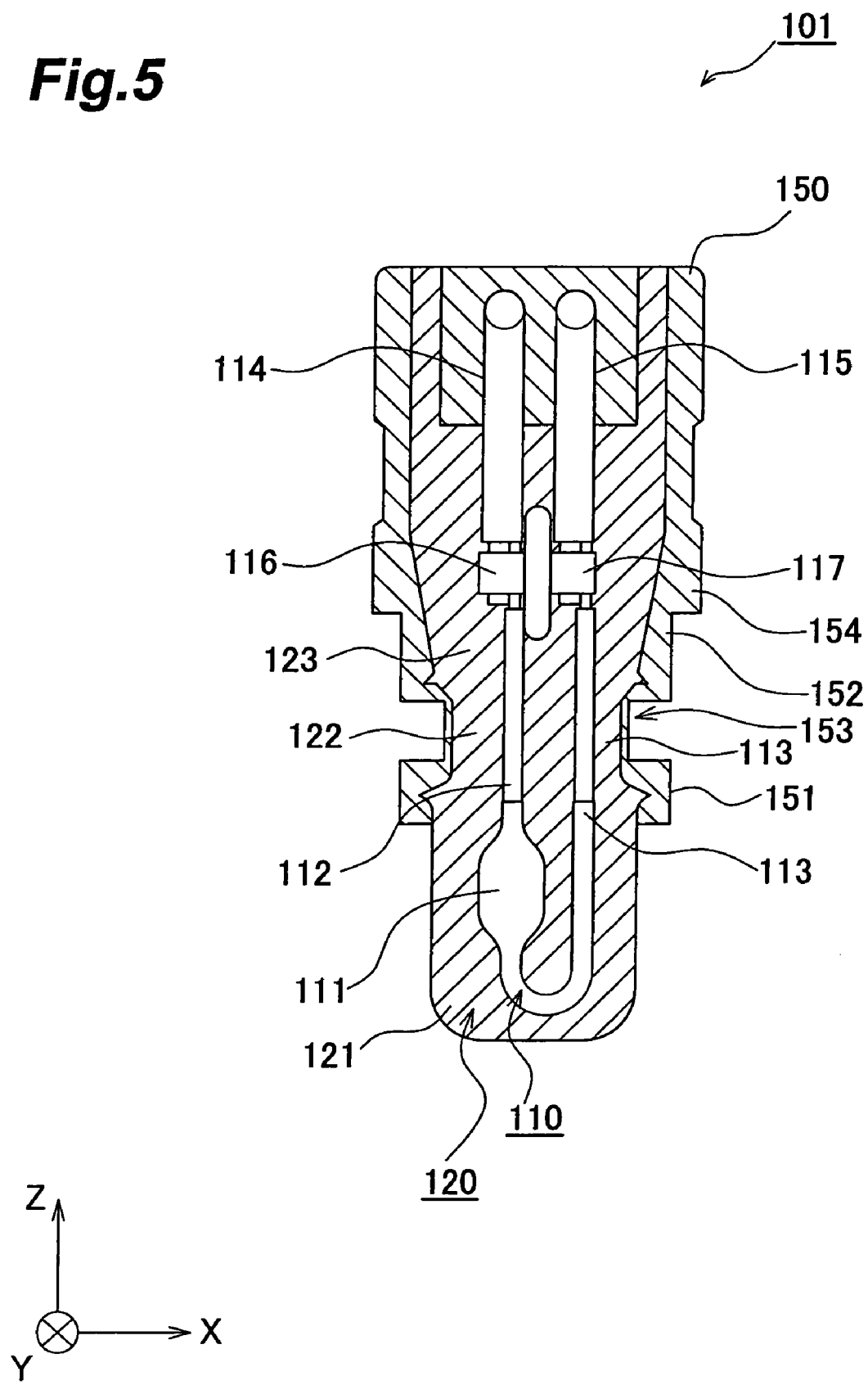
FIG. 5 is a sectional view taken along the line V-V of FIG. 4.
Figure 6:
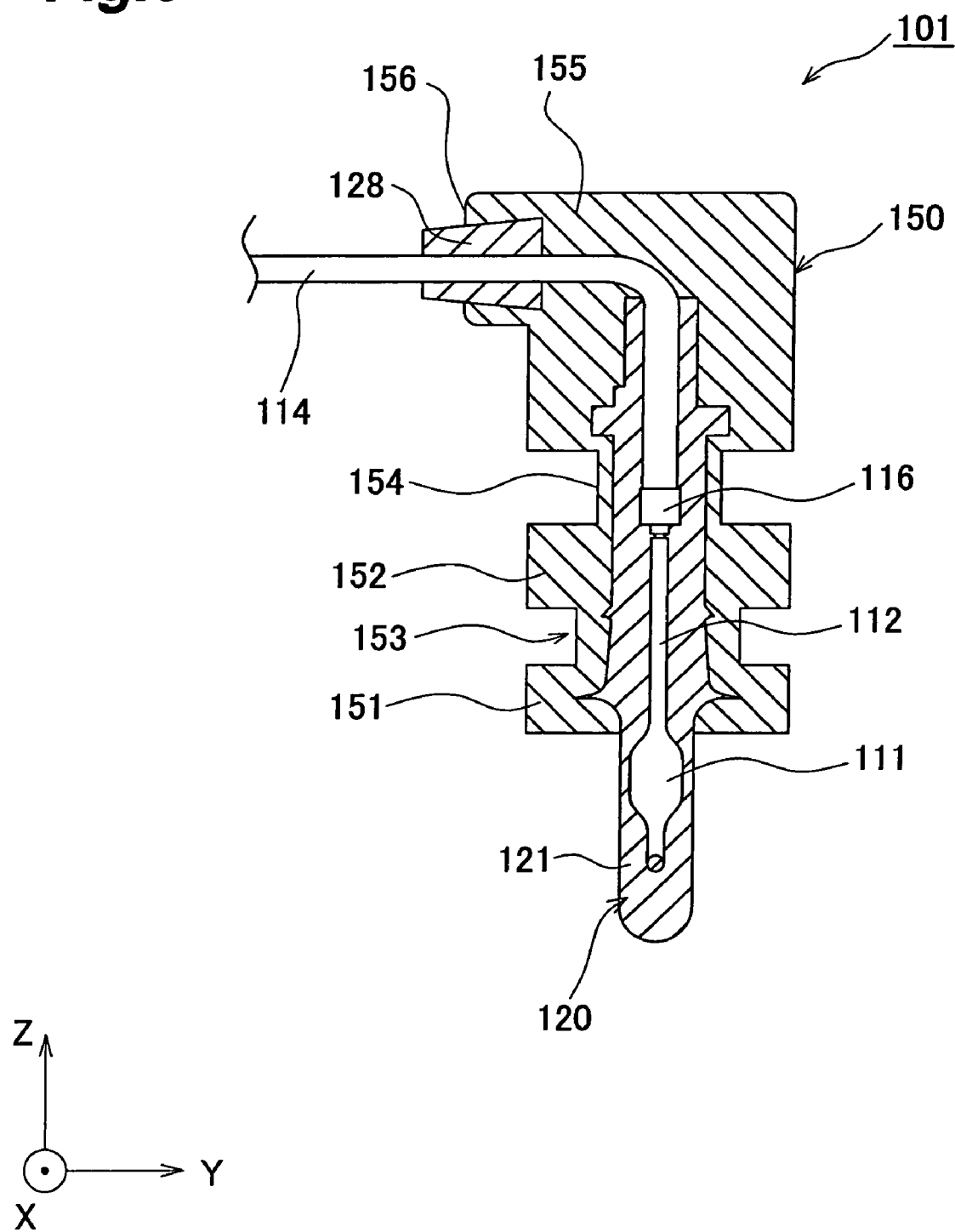
FIG. 6 is a sectional view taken along the line VI-VI of FIG. 4.

A temperature sensor 101 which is the same as the above-mentioned temperature sensor 10 in that the temperature detecting device is covered only with a device protecting part made of a resin will now be explained with reference to FIGS. 4 to 14. FIG. 4 is a perspective view showing the temperature sensor different from the above-mentioned temperature sensor 10. FIG. 5 is a sectional view taken along the line V-V of FIG. 4. FIG. 6 is a sectional view taken along the line VI-VI of FIG. 4. The temperature sensor 101 incorporates a thermistor therein, and detects the temperature of a fluid (ATF) or the like used in an automatic transmission of a car.

Figure 7:
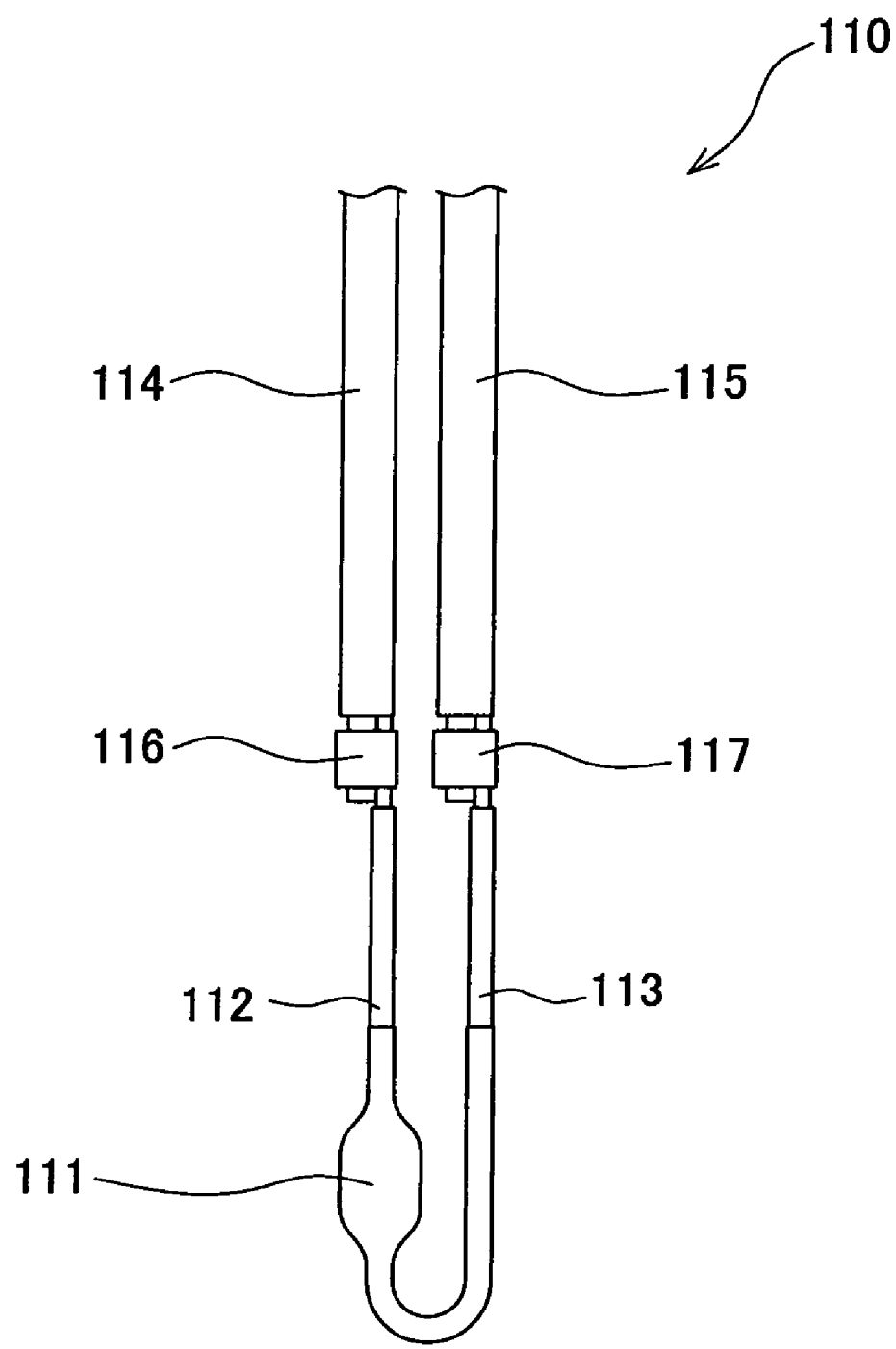
FIG. 7 is a view showing a thermistor contained in the temperature sensor of FIG. 4.

First, with reference to FIG. 7, the thermistor (temperature detecting device) 110 incorporated in the temperature sensor 101 will be explained. The thermistor 110, which is an NTC thermistor, comprises a temperature-sensitive part 111 for detecting the temperature of water, fluids, and the like, and a pair of leads 112, 113 connected to both sides thereof. The temperature-sensitive part 111 is formed from manganese, nickel, cobalt, or the like, for example, so as to become a polycrystal ceramics in which crystal grains of a so-called spinel structure gather. The temperature-sensitive part 111 is coated with an epoxy rubber in order to alleviate the stress received from a resin part (which will be explained later) covering its surroundings. A pair of leads 112, 113 are joined to a pair of conductors 114, 115 coated with a fluororesin (e.g., Teflon (registered trademark)), respectively, by crimping with their corresponding pressure terminals 116, 117.

The configuration of the temperature sensor 101 will now be explained. As shown in FIG. 5, the temperature sensor 101 is constituted by a resin part (device protecting part) 120 directly covering the thermistor 110 and an outer resin part 150 covering the resin part 120. The resin part 120 is formed by first insert molding (primary molding), whereas the outer resin part 150 is formed by second insert molding (secondary molding). The thermistor 110 can be used within a temperature range of −40° C. to 150° C., for example.

The resin part 120 is formed from a PPS resin and has a leading end formed with a first region (sensing part) 121 covering the temperature-sensitive part 111 of the thermistor 110 and coming into direct contact with a fluid or the like to be subjected to temperature measurement. The first region 121 has a flat elliptical cross section.

Figure 8:
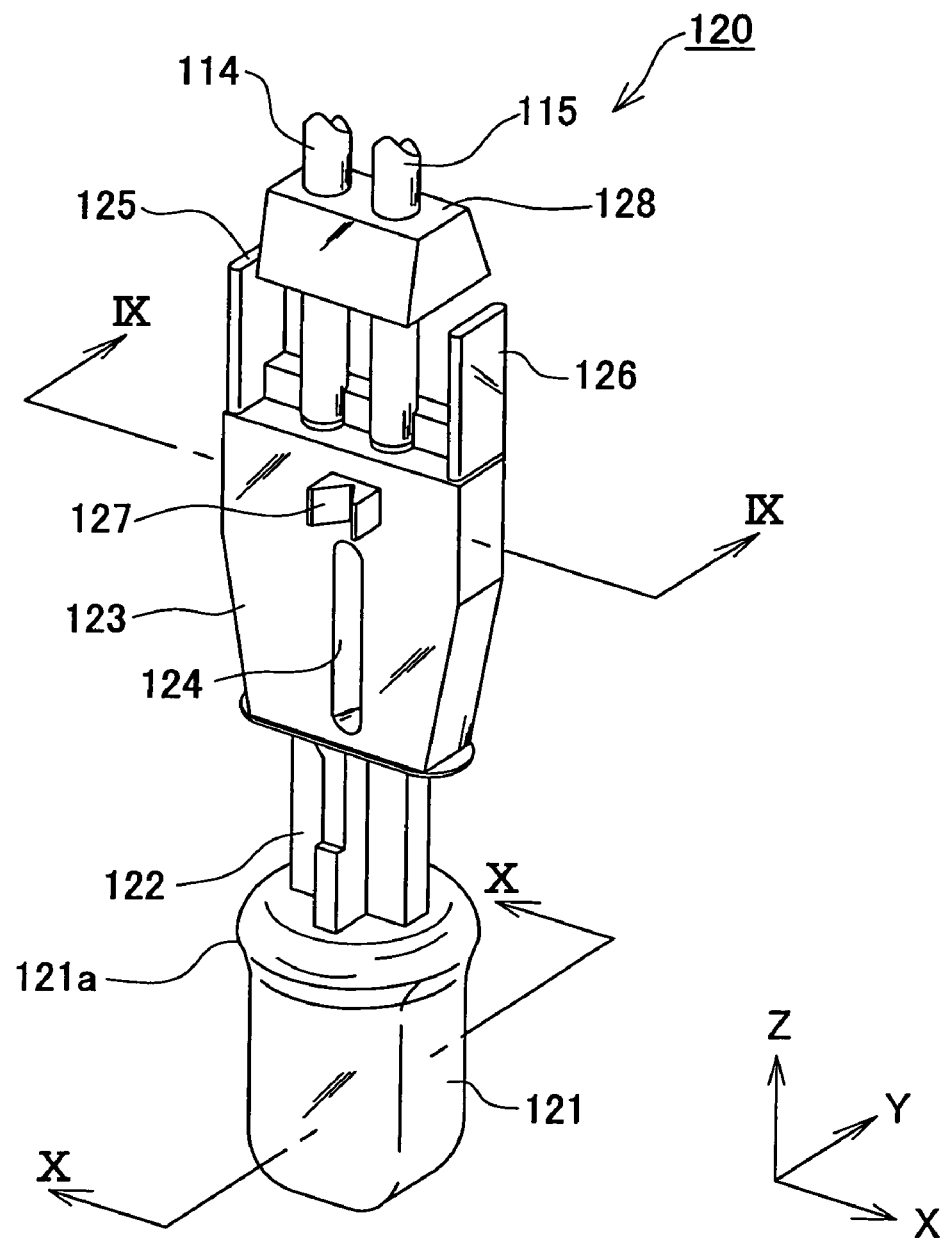
FIG. 8 is a perspective view showing a primary molded body of the temperature sensor of FIG. 4.
Figure 9:
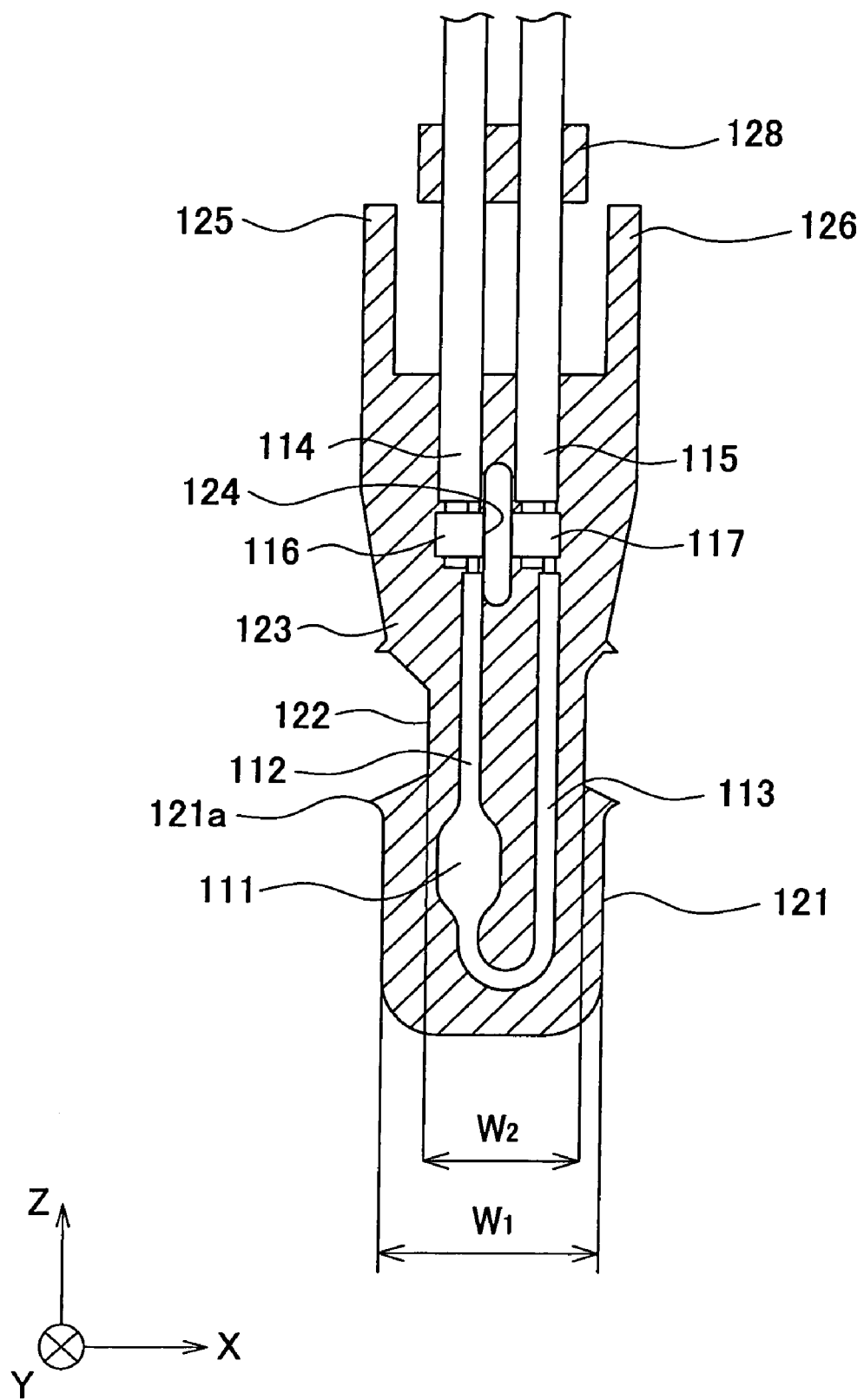
FIG. 9 is a sectional view taken along the line IX-IX of FIG. 8.
Figure 10:
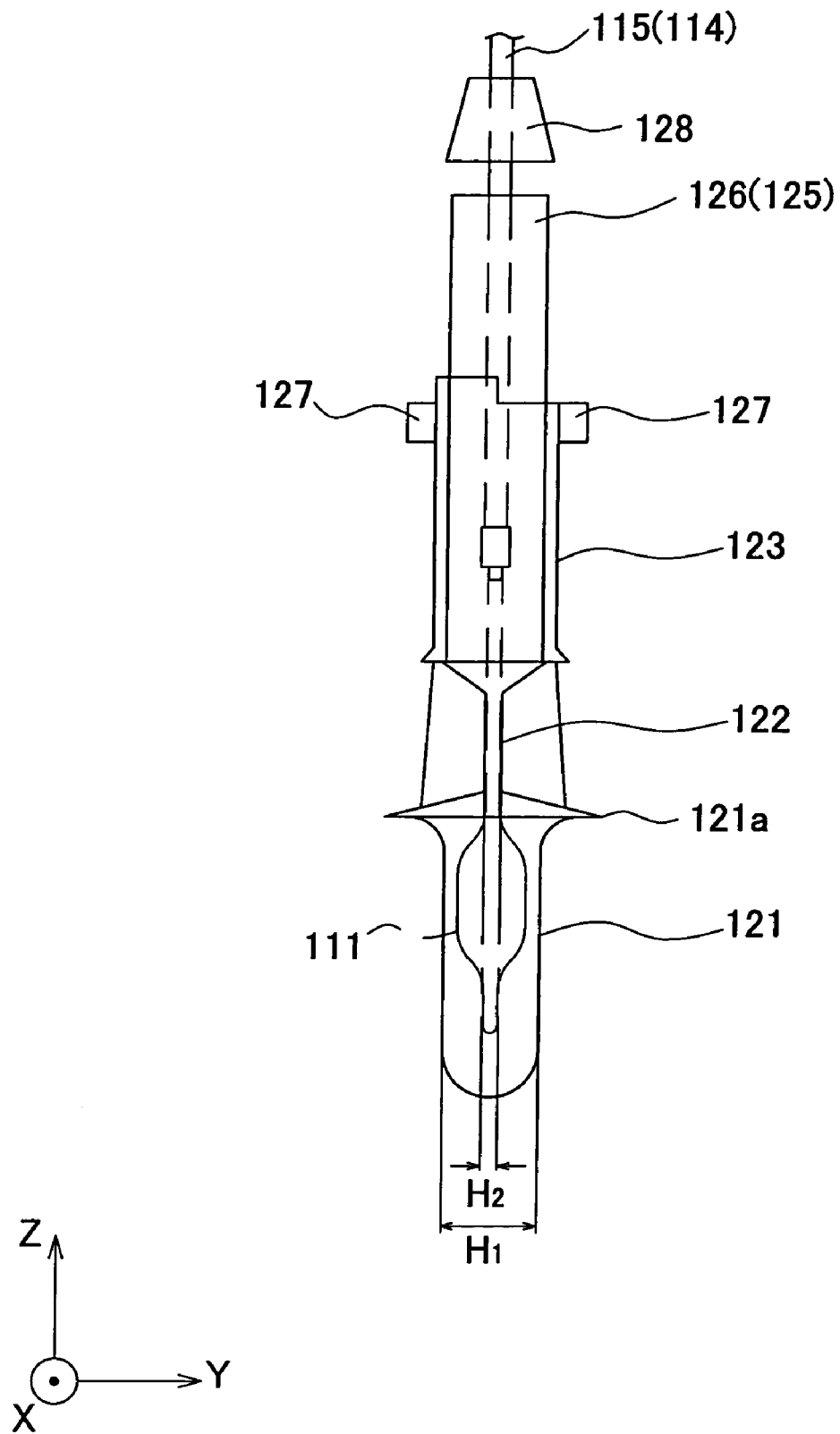
FIG. 10 is a side view in the direction of X-X in FIG. 8.

With reference to FIGS. 8 to 10, the resin part 120 will now be explained in further detail. Each drawing shows the molded body after the primary molding (hereinafter referred to as "primary molded body"). FIG. 8 is a perspective view of the primary molded body. FIG. 9 is a sectional view taken along the line IX-IX of FIG. 8. FIG. 10 is a side view in the direction of X-X in FIG. 8.

In the primary molded body, a second region 122 is formed continuously with the above-mentioned first region 121. The second region 122 covers a part of the pair of leads 112, 113 of the thermistor 110 arranged in parallel. The part of first region 121 joined to the second region 122 is formed with a disk part 121a whose edge portion becomes gradually thinner toward its surroundings. The disk part 121a projects outward in order to elongate the creeping distance, so as to enhance the adhesion to the secondary molding resin.

The second region 122 has a crisscross cross section, whose width $W_2$ is narrower than the width $W_1$ of the first region 121 (see FIG. 9). Here, the width refers to the length in a direction (depicted X direction) in which the pair of leads 112, 113 are aligned. The pair of leads 112, 113 are positioned at both ends in the width direction of the second region 122. In the second region 122, an area where the pair of leads 112, 113 are arranged has a height $H_2$ (in a direction intersecting the above-mentioned width direction; Y direction) smaller than the height $H_1$ of the first region 121 in the same direction.

A third region 123 joins with the second region 122. The third region 123 is wider than the second region 122 and accommodates the above-mentioned pressure terminals 116, 117 connecting the pair of leads 112, 113 to the conductors 114, 115. Formed between the pressure terminals 116, 117, i.e., between the pair of leads 112, 113, is a through hole 124 whose longitudinal direction is oriented in a direction (Y direction) intersecting the direction in which the leads are aligned. A pair of fixing parts 127, 127 project (see FIGS. 8 and 10) from the front and rear faces of the third region 123 above the through hole 124 in the drawing. Each of the fixing parts 127, 127 has a groove with a V-shaped cross section and can position the primary molded body at the time of secondary molding when a fixing bar is brought into contact with the groove. A pair of thin plate parts 125, 126 project from both ends of the upper part in the third region 123, whereas the conductors extend upward from between the thin plate parts 125, 126.

Formed near the thin plate parts 125, 126 is a protective part 128 having a substantially rectangular parallelepiped form covering the surroundings of the conductors 114, 115. The protective part 128 is integrally formed with the above-mentioned first to third regions from the same material, and acts to prevent the conductors 114, 115 from being damaged by coming into contact with molds at the time of secondary molding. Such a protective part for bending the conductors is not always necessary.

Referring to FIGS. 4 to 6 again, the outer resin part 150 will now be explained in detail. The outer resin part 150 defines the outer shape of the temperature sensor 101, and covers a region of the resin part 120 excluding a major part of the first region 121. Namely, the form of the region coming into contact with water, fluids, and the like to be subjected to temperature measurement is defined by the primary molding. The lower region of the outer resin part 150 in the drawings is formed with a pair of ring parts 151, 152, between which a ring groove 153 for inserting an O-ring is formed.

Formed above the upper ring part 152 in the outer resin part 150 is a key receiving part 154 having a rectangular parallelepiped form to which a key plate, which will be mentioned later, is inserted. For preventing the key plate from shifting in vertical directions, the key receiving part 154 has a thickness in the Y direction narrower than each of the ring part 152 positioned thereunder and a head part 155 having a rectangular parallelepiped form positioned thereabove. One side face of the head part 155 is formed with a protrusion 156, whereas the conductors 114, 115 projecting in the vertical direction (Z direction) in the primary molded body are bent at substantially right angles, so as to project from the protrusion 156.

Figure 11:
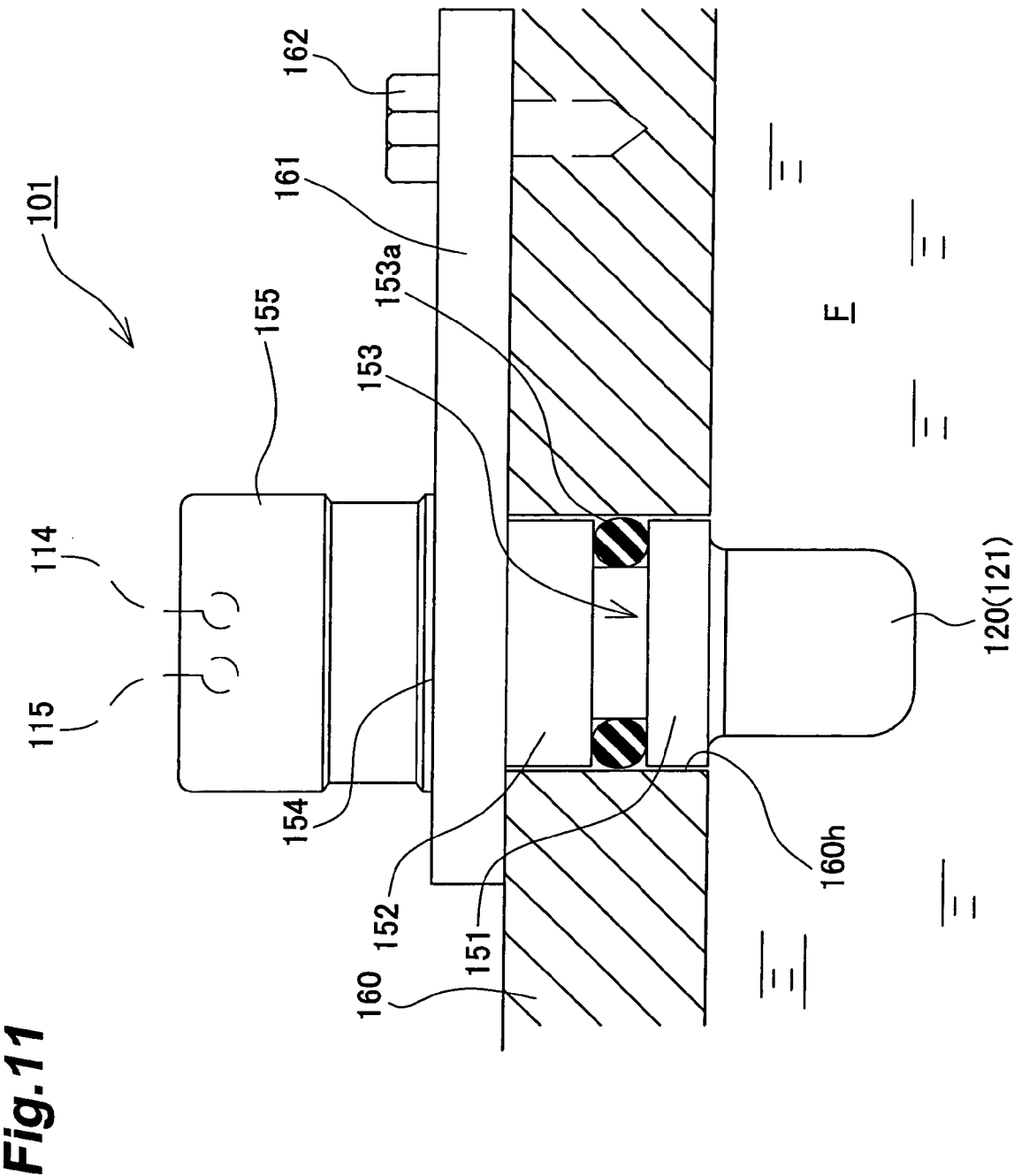
FIG. 11 is a view showing a state where the temperature sensor of FIG. 4 is employed in an automatic transmission.

FIG. 11 shows an example in which such a temperature sensor 101 is employed. This drawing shows an example in which the temperature sensor 101 is employed for measuring the temperature of a fluid F in an automatic transmission and is mounted to a case 160 containing the fluid F. The case 160 is formed with a circular through hole 160h in which the ring parts 151, 152 of the temperature sensor 101 are accommodated. An O-ring is fitted into the ring groove 153, so as to seal the gap between the case 160 and the temperature sensor 101. The first region 121 of the resin part 120 is dipped in the fluid F. On the other hand, a key plate 161 is inserted to the key receiving part 154 positioned on the outside of the case 160, and is secured to the case 160 with a screw 162. Information of the fluid temperature detected by the temperature sensor 101 is transmitted to an electronic control unit (ECU) of the automatic transmission. According to the received information of fluid temperature, the electronic control unit regulates a transmission timing and the like.

In the temperature sensor 101, as explained in detail in the foregoing, the thermistor 110 is accommodated in the first region 121 of the resin part 120 dipped in the fluid F within the case 160. Namely, the thermistor 120 is covered only with the resin part 120 without using a conductive holder. Therefore, the thermistor 110 and the lead pair 112, 113 will not come into contact with conductors. Thus, unlike conventional temperature sensors in which a thermistor is accommodated in a holder made of a metal, the temperature sensor 101 is not required to take account of insulation of the thermistor and harness pair from conductors at the time of accommodating the thermistor into the holder, so that the operation of making the sensor becomes simpler, thereby increasing the efficiency in the operation of making the same.

A method of making the temperature sensor 101 and temperature sensor molds favorably used in this method will now be explained.

Figure 12:
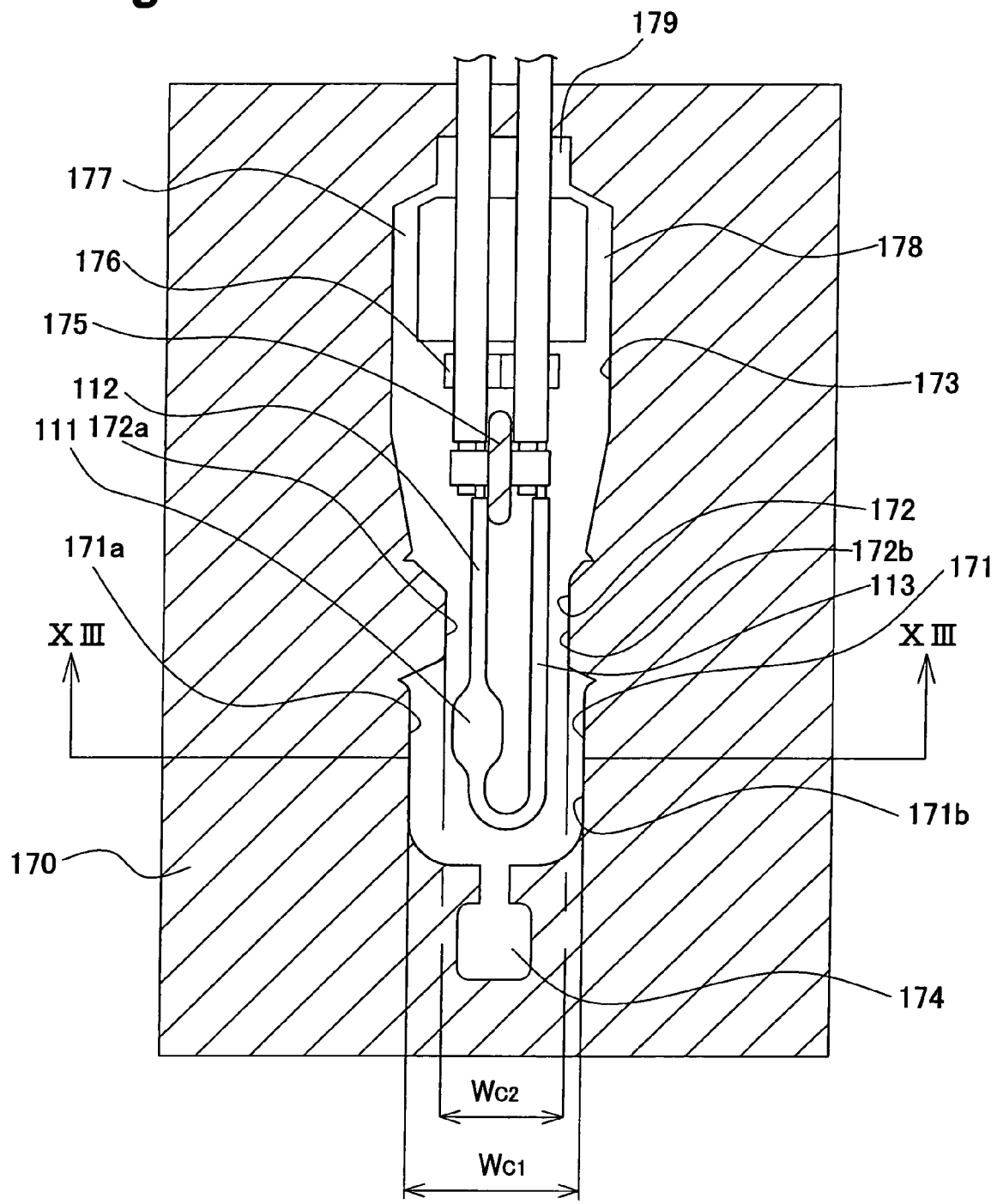
FIG. 12 is a view showing a mold on the stationary side in molds for the temperature sensor of FIG. 4.

First, as shown in FIG. 12, a mold (temperature sensor mold) 170 for insert molding (primary molding) of the temperature sensor 101 is prepared. Though a stationary mold and a movable mold are used as molds, only the mold 170 on the stationary side will be explained in detail here. The mold on the movable side may conform to the outer shape of the temperature sensor. The cavity of the mold 170 comprises a first cavity region 171 for forming the first region 121 of the resin part 120; a second cavity region 172, continuous with the region 171, for forming the second region 122; and a third cavity region 173, continuous with the region 172, for forming the third region 123. The width $W_{C2}$ of the second cavity region 172 is narrower than the width $W_{C1}$, of the first cavity region 171.

Formed in an area opposite from the second cavity region 172 in the first cavity region 171 is a space 174 for spreading an injected resin to the leading end of the first cavity region 171. Erected in the third cavity region 172 is a partition wall 175 for forming the above-mentioned through hole 124. The mold on the movable side is provided with a similar partition wall 181 (see FIG. 13), such that the partition walls 175, 181 abut against each other when the molds are closed. On the side opposite from the second cavity region 172 in the partition wall 175, a groove 176 for forming the above-mentioned fixing part 127 of the primary molded body is provided. The groove 176 has such a slope that the center part is the shallowest while both end parts are the deepest. The third cavity region 172 is provided with spaces 177, 178 for forming the thin plate parts 125, 126 of the primary molded body. A protective part cavity region 179 for forming the protective part 128 for protecting the conductors 114, 115 is connected to the spaces 177, 178.

The mold 170 also comprises various known elements which are not depicted. Examples of such elements include gates for injecting the resin into the cavity, ejector pins for taking the molded body out of the mold, guide pins and guide bushings for accurately fitting the molds on the stationary and movable sides to each other.

After preparing the mold 170 explained in the foregoing, the thermistor 110 is set therein. Here, as shown in FIG. 12, the temperature-sensitive part 111 is positioned at the first cavity region 171, whereas a pair of leads 112, 113 are aligned in the second cavity region 172. The leads 112, 113 are caused to path both sides of the partition wall 175 one by one. After setting the thermistor 110, the mold on the movable side is moved toward the mold 170 on the stationary side, so that the molds are closed.

Figure 13:
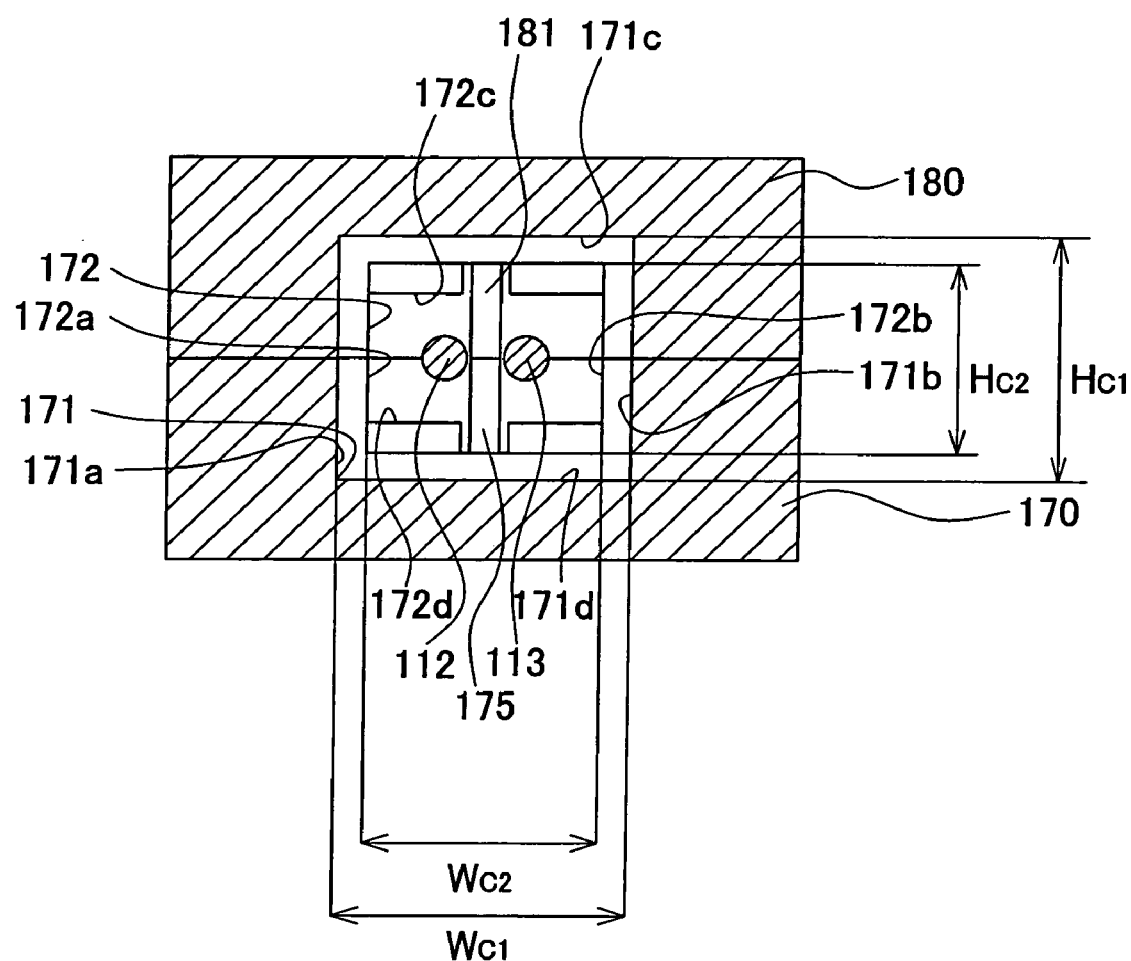
FIG. 13 is a sectional view taken along the line XIII-XIII of FIG. 12.

FIG. 13 is a sectional view of the closed state taken along the line XIII-XIII of FIG. 12. Numeral 180 refers to the mold on the movable side. In the second cavity region 172, as clearly shown in FIG. 13, not only the width $W_{C2}$ is narrower than the width $W_{C1}$ of the first cavity region 171, but also the height $H_{C2}$ in the area provided with the leads 112, 113 is lower than the height $H_{C1}$ in the first cavity region 171.

After the closing, a resin is injected at a high pressure into the cavity through a gate, and insert molding is performed. Since a PPS resin having a high fluidity is used here, the resin is distributed throughout the cavity even when the molds have a complicated form, whereby highly accurate resin molding can be realized. Also, the resin has such a high thermal conductivity that it does not affect the temperature detection level of the temperature detecting device. Further, since the mold 170 is configured as mentioned above, the process of injecting the resin into the first cavity region 171 and second cavity region 172 can simultaneously inject the resin into the protective part cavity region 179. This makes it unnecessary to perform two injection-molding operations for the process of forming the first region 121, second region 122, and the like and the process of molding the protective part 128, and thus can reduce the number of resin injecting operations, thereby simplifying the manufacturing operation.

The foregoing manufacturing method yields the following effects. Namely, even when the thermistor 110 is shifted because of a pressure acting thereon at the time of resin injection, the leads 112, 113 come into contact with inner wall faces 172a, 172b, thereby restricting the movement of the thermistor 110. This keeps the temperature-sensitive part 111 from reaching inner wall faces 171a, 171b of the first cavity region 171 at the time of insert molding. As a consequence, in thus obtained temperature sensor 101, the temperature-sensitive part 111 of the thermistor 110 is restrained from being exposed to the surface of the resin part 120 covering the same. Since the exposure of the temperature-sensitive part 111 is suppressed, it is not necessary to cover the first region 121 where the thermistor 110 is positioned in the secondary molding, which will be explained later, whereby the resin size about the temperature-sensitive part 111 can be reduced.

Since the height $H_{C2}$ in the area provided with the leads 112, 113 is lower than the height $H_{C1}$ in the first cavity 171, inner wall faces 172c, 172d of the second cavity region 172 can restrict the movement of the leads 112, 113 even when the thermistor 110 is shifted in the height direction by the pressure of the resin injected, whereby the temperature-sensitive part 111 can be kept from reaching inner wall faces 171c, 171d of the first cavity region 171. Therefore, the temperature-sensitive part 111 can further be restrained from being exposed to the surface of the resin part 120 covering the same.

The thermistor 110 is set into the mold 170 such that leads 112, 113 pass both sides of the partition wall 175 one by one. As a consequence, the partition wall 175 can restrain the leads 112, 113 from moving toward each other, thereby more effectively suppressing the shifting of the thermistor 110.

After completing the resin injection for the primary molding, the molds are opened, and the molded body is taken out from the molds by an ejector pin. Subsequently, the portion connecting the protective part 128 to the thin plate parts 125, 126 is severed, and the portion formed by the space 174 is cut off. This yields the primary molded part shown in FIGS. 8 to 10.

Figure 14:
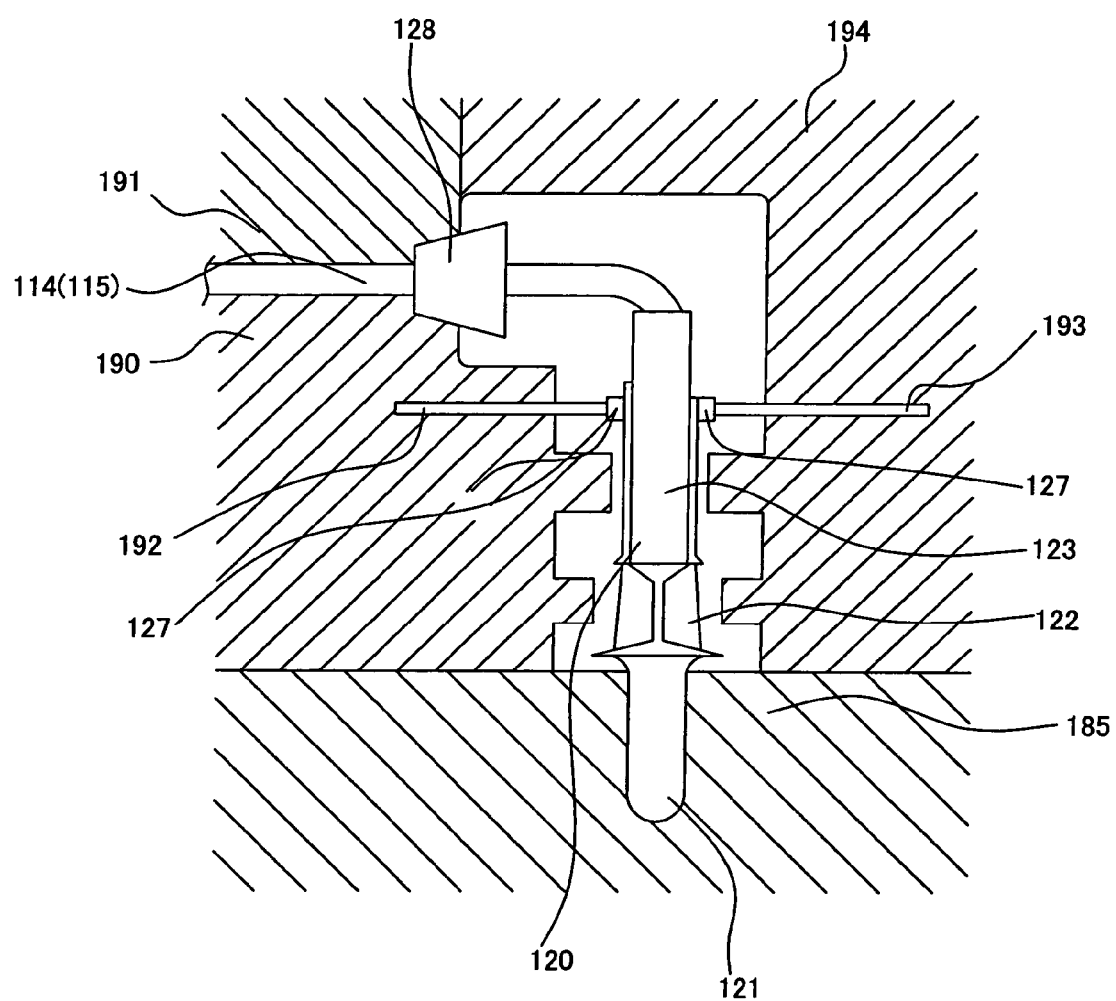
FIG. 14 is a view showing a process of performing secondary molding.

With reference to FIG. 14, the process of subjecting the primary molded body to the secondary molding will now be explained. First, the linearly extending leads 114, 115 are bent at substantially right angles, so that the first region 121 covering the thermistor 110 is inserted into the through hole of a mold 185, whereas the protective part 128 covering the leads 114, 115 is held by a pair of lower and upper molds 190, 191. Namely, no resin is molded in the surroundings of a major part of the first region 121 (an area extending from a leading end portion to the vicinity of the second region 122) in the secondary molding. A bar 192 is attached to the inner face of the lower mold 190 forming the cavity, so as to abut against one fixing part 127 of the primary molded body.

After the primary molded body is secured to the lower mold 190 and upper mold 191, which are molds on the stationary side, a mold 194 on the movable side is moved, so that the molds are closed. Here, a bar 193 attached to the mold 194 abuts against the other fixing part 127 of the primary molded body, whereby the primary molded body can be positioned and fixed within the molds.

After the foregoing preparation is done, a resin is injected from a gate of the molds, so as to perform secondary molding. Though the PPS resin is injected here as in the primary molding, other resins may be used as well. In the secondary molding, the leads 114, 115 are held by the lower mold 190 and upper mold 191 by way of the protective part 128, and thus can be restrained from being damaged by these molds. After completing the resin injection for the secondary molding, the molds are opened, and then the molded body is taken out from the molds by an ejector pin. This yields the temperature sensor 101 shown in FIGS. 4 to 6.

In thus obtained temperature sensor 101, the outer shape of the first region 121 covering the temperature-sensitive part 111 of the thermistor 110 is defined by the primary molding alone, so that there is no need for the secondary molding to cover the first region 121, whereby the resin size about the temperature-sensitive part can be reduced. Also, the amount of resin used can be decreased, so as to cut down the cost. The outer resin part formed by the secondary molding is only required to cover the resin part except for at least a part of the first region 121, and may exclude all the first region and may further exclude areas other than the first region as well. The temperature sensor may be manufactured by the primary molding alone without performing the secondary molding.

Without being restricted to the above-mentioned embodiment, the present invention can be modified in various manners. For example, the angle of the hook part formed in the holder with respect to the holder side wall is not restricted to the right angle (90 degrees), but may appropriately be varied within the range of 0 to 90 degrees as long as the holder engages the sensor cover. The neck part is not limited to the T-shape, but may be formed like a rod or plate as long as it can appropriately guide harnesses.

Further, the resin constituting the holder and the resin constituting the filler resin part is not limited to the combination of PPS resin and epoxy resin. For example, the resin constituting the holder may be a liquid crystal polymer, polyamide, polyimide, or the like, and may be of the same species as that constituting the filler resin part.

The invention claimed is:

1. A temperature sensor comprising:
   a bottomed tubular holder having an opening;
   a temperature detecting device, contained in a bottom part of the holder, having a lead pair connected thereto so as to be introduced from an opening side;
   a filler resin part filling the holder so as to seal the temperature detecting device and extending to the opening; and
   a sensor cover comprising a cap part covering the whole opening and a neck part extending from the cap part in a direction generally parallel to the opening of the bottomed tubular holder, wherein
   the cap part and the neck part are integrated together, and
   the neck part is extending from the cap part in a direction substantially perpendicular to an extending direction of the holder.

2. A temperature sensor according to claim 1, further comprising a guide part, projecting from an edge of the opening in the holder, for guiding leads constituting the lead pair;
   wherein the sensor cover covers the guide part.

3. A temperature sensor according to claim 1, wherein an edge of the opening of the holder is formed with a substantially annular hook part projecting to an outside of the holder; and
   wherein the hook part engages at least a part of the sensor cover.

4. A temperature sensor according to claim 1, wherein the sensor cover is formed by hot melt molding.

5. A temperature sensor according to claim 1, wherein the holder is constituted by a resin; and
   wherein the temperature detecting device is covered only with a device protecting part constituted by the holder and the filler resin part.

6. A temperature sensor according to claim 5, wherein the holder and filler resin part are constituted by different kinds of resins.

7. A temperature sensor according to claim 5, wherein the holder and the filler resin part are constituted by the same kind of resins.

8. A temperature sensor according to claim 5, wherein the device protecting part contains a polyphenylene sulfide resin as a constituent material.

9. A temperature sensor comprising:
   a bottomed tubular holder having an opening;
   a temperature detecting device, contained in a bottom part of the holder, having a lead pair connected thereto so as to be introduced from an opening side;
   a filler resin part filling the holder so as to seal the temperature detecting device and extending to the opening;
   a sensor cover comprising a cap part covering the whole opening and a neck part extending from the cap part in a direction generally parallel to the opening of the bottomed tubular holder, wherein the cap part and the neck part are integrated together; and
   a guide part, projecting from an edge of the opening in the holder, for guiding leads constituting the lead pair;
   wherein the sensor cover covers the guide part, and the lead pair extending substantially vertically from the filler resin part is bent at substantially right angles toward the guide part.

10. A temperature sensor according claim 9, wherein the guide part has a T-shaped form including a part extending in a direction perpendicular to an extending direction of the holder and a part extending parallel to the extending direction of the holder.

11. A temperature sensor according to claim 9, wherein an edge of the opening of the holder is formed with a substantially annular hook part projecting to an outside of the holder; and
   wherein the hook part engages at least a part of the sensor cover.

12. A temperature sensor according to claim 9, wherein the sensor cover is formed by hot melt molding.

13. A temperature sensor according to claim 9, wherein the holder is constituted by a resin; and
   wherein the temperature detecting device is covered only with a device protecting part constituted by the holder and the filler resin part.

14. A temperature sensor according to claim 13, wherein the holder and filler resin part are constituted by different kinds of resins.

15. A temperature sensor according to claim 13, wherein the holder and the filler resin part are constituted by the same kind of resins.

16. A temperature sensor according to claim 13, wherein the device protecting part contains a polyphenylene sulfide resin as a constituent material.

* * * * *